Nov. 22, 1955

R. C. RUHLAND 2,724,631

GRAPHIC RECORDER

Filed Feb. 25, 1950

INVENTOR.
ROMAN C. RUHLAND
BY Arthur H. Swanson
ATTORNEY.

Nov. 22, 1955    R. C. RUHLAND    2,724,631
GRAPHIC RECORDER
Filed Feb. 25, 1950    7 Sheets-Sheet 3
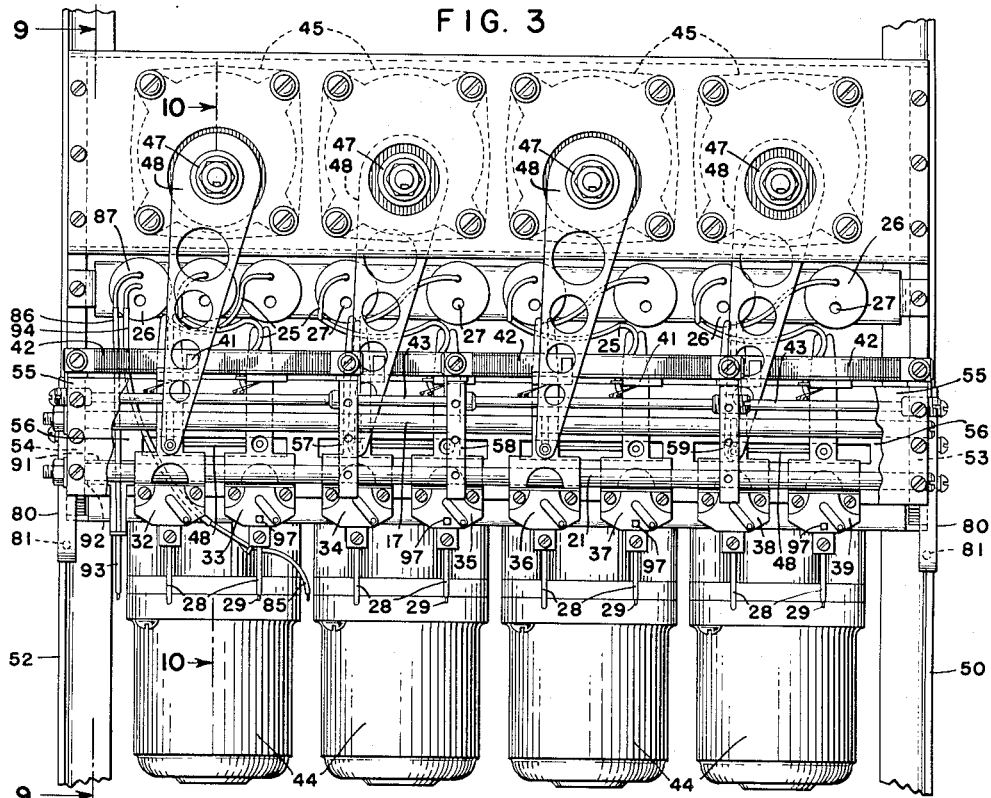
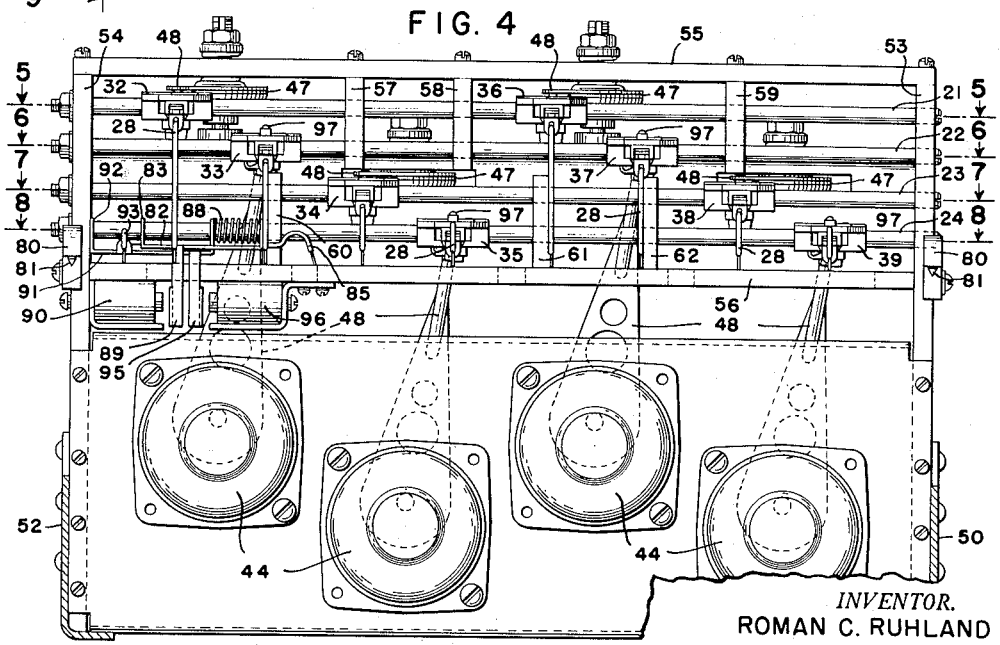
INVENTOR.
ROMAN C. RUHLAND
BY Arthur H. Swanson
ATTORNEY.

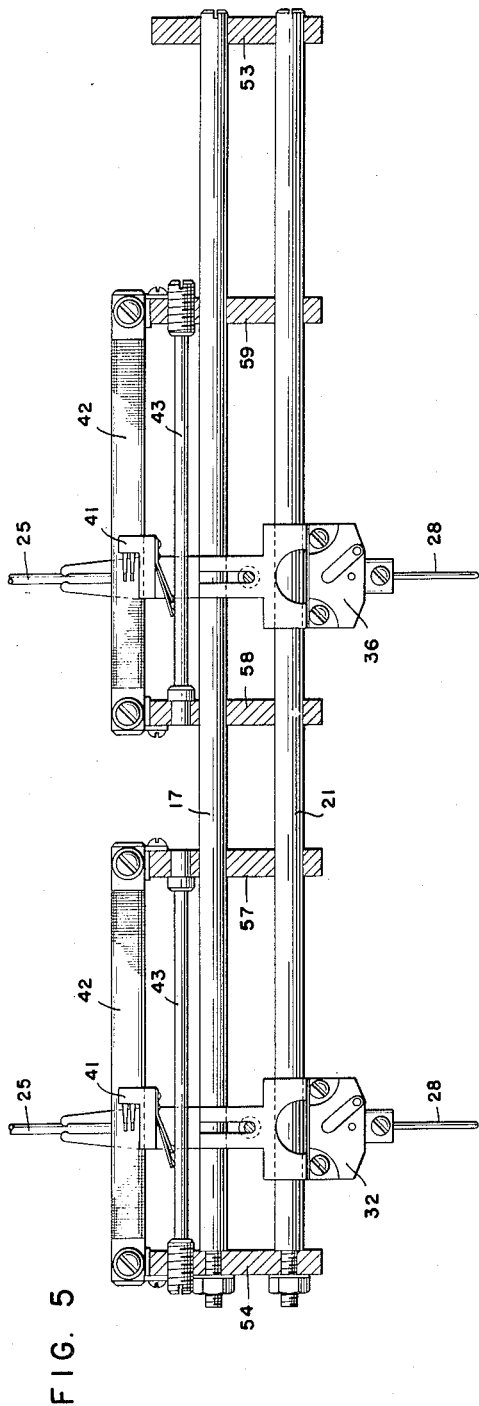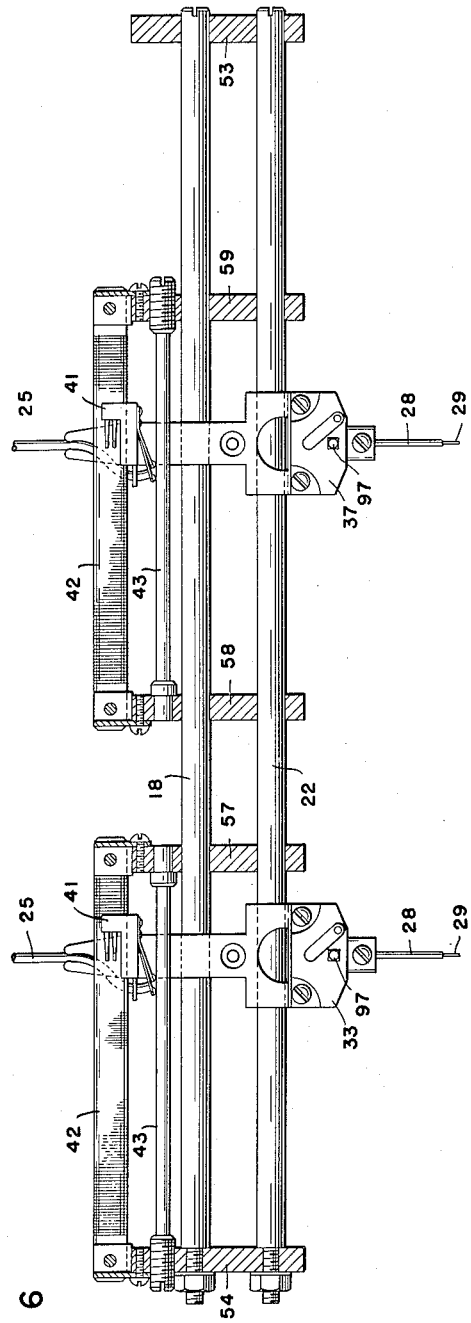

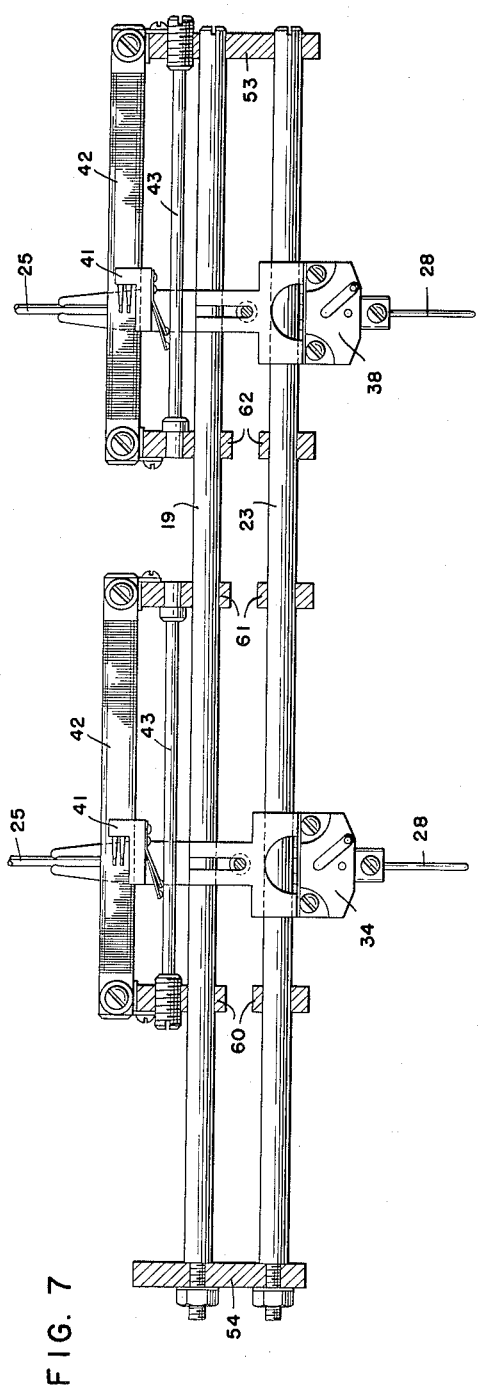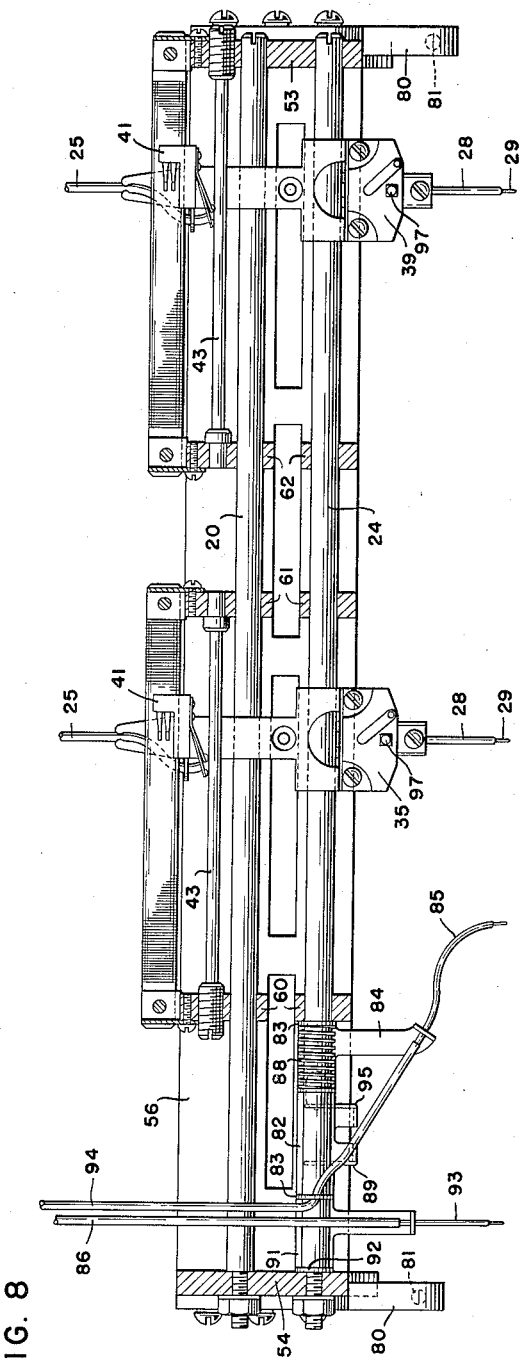

Nov. 22, 1955  R. C. RUHLAND  2,724,631
GRAPHIC RECORDER

Filed Feb. 25, 1950  7 Sheets-Sheet 6

INVENTOR.
ROMAN C. RUHLAND
BY Arthur H. Swanson
ATTORNEY.

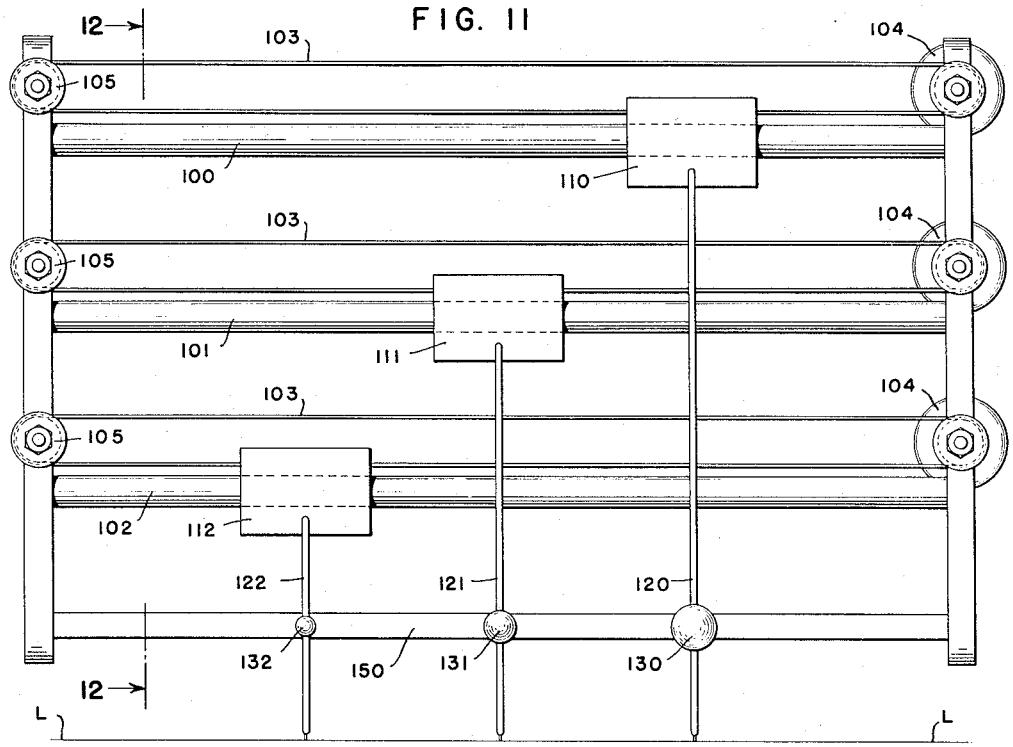
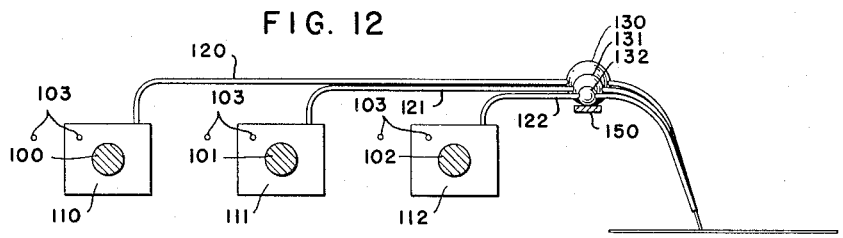
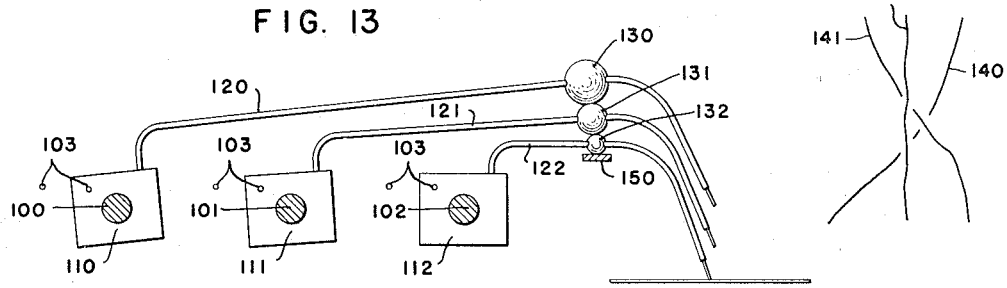

United States Patent Office 2,724,631
Patented Nov. 22, 1955

2,724,631
GRAPHIC RECORDER

Roman C. Ruhland, Minneapolis, Minn., assignor to Minneapolis-Honeywell Regulator Company, Minneapolis, Minn., a corporation of Delaware Application February 25, 1950, Serial No. 146,345

14 Claims. (Cl. 346—49)

An object of this invention is to facilitate programs of research, development, measurement, indication, and control by providing a graphic recorder for accumulating data. This recorder possesses a number of outstanding features which are particularly advantageous from the standpoint of simplicity of operation and of accuracy and readability of the finished graph as explained in detail in the annexed specification.

Another object is to make readily available a recorder particularly useful for recording data associated with a wide variety of functions. These uses include the recording of variables encountered in the study of temperatures, velocities, displacements, electrical potentials or currents, hydraulic or pneumatic pressures, flow, light intensity, magnetism, hydrogen ion concentration and similar conditions whose amplitude, frequency, or recurrence vary with respect to time.

A further object is to furnish a recorder forming part of equipment primarily intended for use in conjunction with testing apparatus associated with the aeronautical industry. The dimensions and constructions of the separate components of such equipment, and the weight and power requirements thereof, are such as to enable its installation in an airplane for the compilation of data under actual flight conditions.

An additional object is to afford a recorder unit containing all the facilities required for the actual production of a graph. These include recording pens, pen drive motors, paper supply, and paper feed mechanism. The physical size of each facility is relatively small, increasing the portability and stowability of the recorder.

Still another object is to provide a recorder having an automatic means of graphically recording various types of data accurately and with a minimum of operational attention. Its ability simultaneously to record the graphs of a plurality of separate functions, for example, eight, on the same, continuous run of standard width, coordinate graph paper, and with respect to a common time base ordinate, makes it particularly useful in the testing, analyzing, and comparing of equipment whose operations are inter-related.

This recorder has, in addition to the eight function-recording pens, two additional pens forming markers whereby chronographic records can be inscribed directly on the chart on the same time base ordinate with other recording activities.

Ease and quickness of paper loading is provided by a demountable paper carriage assembly which slides into the main recorder. By the use of two or more pre-loaded carriages, magazine loading principles can be employed, thus minimizing the lapse in recording activities necessitated by renewal of the paper supply during excessively long tests.

An important object of this invention is the provision of means whereby two or more pens can record at the same time a corresponding number of different variable factors at any point on the same line representing a time ordinate. To this end, suitable cam mechanism is interposed between the pens for the actuation of one or more of the pens out of engagement with the chart and thereby out of the position occupied by another of the pens when the variable factors measured by the two pens have the same value.

Yet a further object of this invention is to provide means whereby the chart and the chassis on which it is mounted can be removed quickly and readily from the recorder and moved either in a backward or forward direction so as to scan the entire graph which has been recorded and thus direct attention to any particular part of the graph or to note any trend in the relation of the variables forming the graph to one another. To this end, a suitable crank arm is provided for moving the chart in a forward or backward direction as desired. The fact that the chart and chassis can be readily removed as a unit permits observation and scanning of the various records to be made at a location convenient for easy readability and thus greatly facilitates the usefulness of the recorder.

One other object of this invention is the provision of a pair of pens, a pair of motors each responsive to a change of electric condition representing a change in a measured variable, and operating mechanisms each between one of said motors and one of said pens and each movable in a plane at right angles to the plane of the other operating mechanism, an exceedingly compact mechanism which is very economical of space.

The various features of novelty which characterize this invention are pointed out with particularly in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a top or plan view of the rear end of the recorder.

Fig. 4 is a transverse, vertical, cross section on line 4—4 of Fig. 2.

Fig. 5 is a partial, transverse, horizontal, cross section on line 5—5 of Fig. 4.

Fig. 6 is a partial, transverse, horizontal, cross section on line 6—6 of Fig. 4.

Fig. 7 is a partial, transverse, horizontal, cross section on line 7—7 of Fig. 4.

Fig. 8 is a partial, transverse, horizontal, cross section on line 8—8 of Fig. 4.

Fig. 11 is a diagrammatic top or plan view of a modification.

Fig. 12 is a diagrammatic view in longitudinal, vertical cross section of the modification shown in Fig. 11 as seen from line 12—12 in the direction of the arrows.

Fig. 13 is a view similar to Fig. 12 showing the pen arms and the cams carried thereby aligned in the same vertical plane.

Fig. 14 is a partial top or plan view of the chart showing the graphs.

General description

Figure 1:
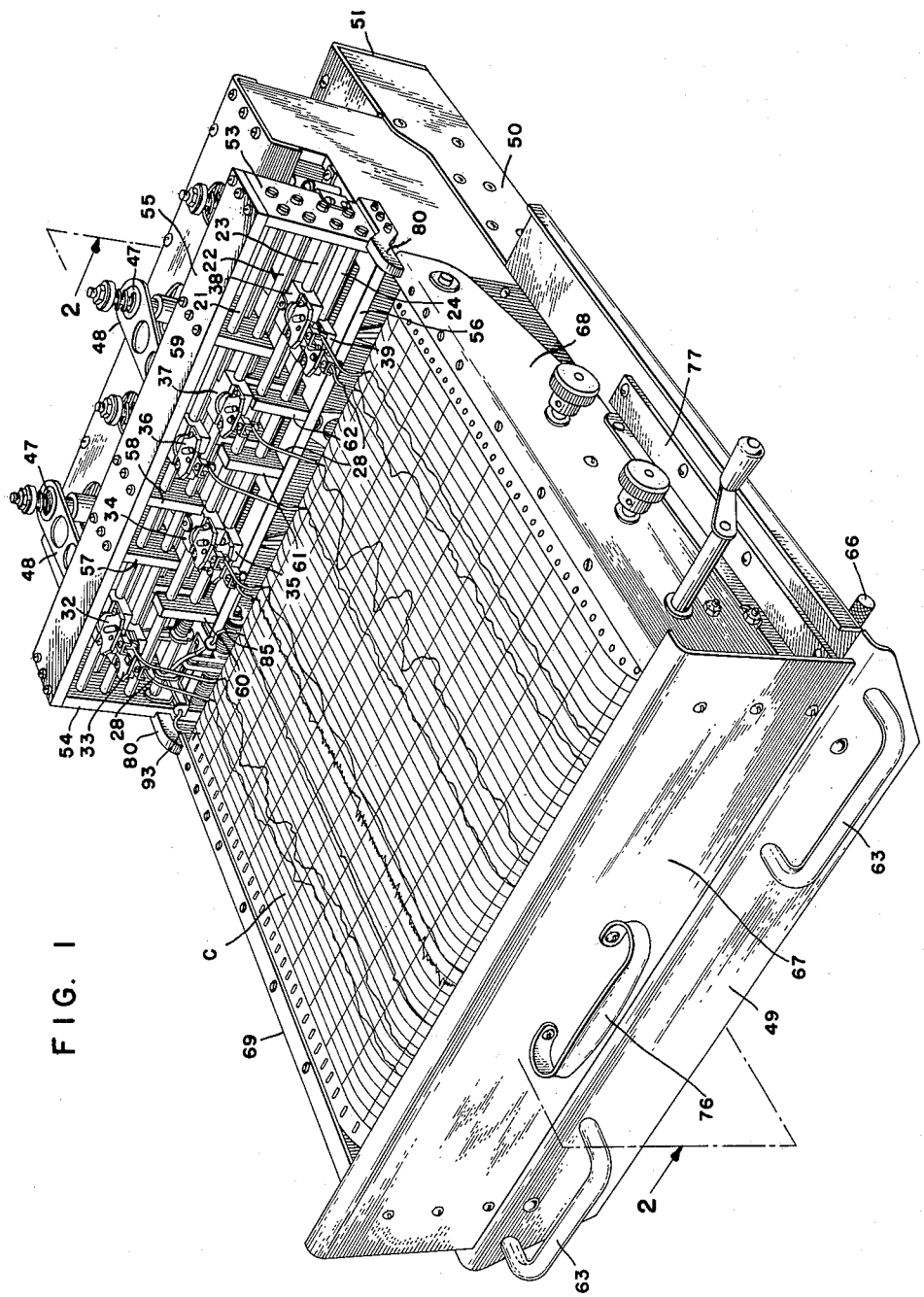
Fig. 1 is a perspective view showing the front and right side of the recorder.

The recorder of this invention forms part of equipment consisting of three basic components: the recorder unit proper; an eight-channel, electronic amplifier and converter unit; and a measuring circuit unit including suitable calibration means. These three units are physically independent of each other, permitting each to be mounted separately as dictated by the available space and facilities. By way of illustration each electronic amplifier and converter unit and the associated measuring circuit unit may be of the type disclosed and claimed in the Wills Patent 2,423,540. Quick-connecting-type electrical plugs and preformed cabling provide quick, efficient means of electrically interconnecting the units. The system is designed to operate on 115 volt, 400 cycle-per-second, alternating current, and 28 volt, direct current.

Basic principles of operation

The principle by which the recorder system converts all types of available data into graphic form is based on the operation of the simple null balance type resistance bridge circuit. In its simplest form, this circuit consists of two potentiometers ("pots."), with sliding contacts (wipers), connected in parallel across a source of potential. The electrical characteristics of the two potentiometers are, therefore, identical and, for every point on one potentiometer, there is a corresponding point of the same potential on the other potentiometer winding. When the two wipers contact these points of equal potential, the bridge is said to be in "balance."

When one of the wipers is moved from the established balance point, a difference of potential is caused to exist between them. This potential difference, or error voltage, will have an amplitude directly proportional to the amount of physical displacement between the two wipers. This voltage can be reduced, and finally eliminated, by either returning the displaced wiper to its original position, or moving the second wiper until it contacts the corresponding point of equal potential on its potentiometer winding.

As applied to the recorder of the present invention, variations of the function to be recorded are made to actuate the wiper of one potentiometer. The error voltage, which is caused to exist each time this wiper is moved from the balance point, is amplified and applied to an electric motor. The motor output shaft is mechanically coupled to the wiper of the balancing potentiometer. When the motor is caused to operate by the application of an amplified error voltage, the balance "pot." wiper moves over the windings seeking a position of correspondingly equal potential. When this position is reached, the bridge balance is again restored, the error voltage eliminated, and the motor ceases to operate.

The recording pen is also mechanically coupled to the motor output shaft. Since the pen moves simultaneously with the balance "pot." wiper, its locus is an exact graphic representation of the original function variations which created the error voltage. By moving an appropriate graph paper at a constant known speed beneath the pen, and establishing a scale relationship which expresses a unit of the graph in terms of a unit of the function being recorded, the variations of the function are accurately graphed both as to amplitude and frequency.

A velocity generator assembly forms as integral part of each of the electric drive motors. The armature of the generator assembly is mounted on the rotor shaft of the motor and, consequently, rotates at an equal speed. The output voltage of the generator is, therefore, directly proportional to the speed of rotation of the drive motor. This voltage is applied to the amplifier in the form of degenerative feedback, supplying the necessary damping to prevent overshooting of the pens and balance "pot." wipers. Adjustments are provided for regulating the amount of feedback thus enabling the critical value to be selected which assures the highest degree of system sensitivity while limiting the tendency of the balance "pot." wiper to overshoot due to mechanical inertia.

General description of recorder

The recorder assembly (Fig. 1) contains all the electrical and mechanical components required for the actual production of the ten graphs. All the components are rigidly attached to the assembly chassis except the recording paper carriage assembly which slides into the chassis on tracks, and is held in position by a spring catch. Two multiple-prong AN receptacles are mounted directly on the chassis and provide the necessary facilities for making electrical connections with the amplifier, calibrator, and primary source of power.

Two separate, easily removable covers are not shown. These covers protect the recorder mechanism against dirt and accidental damage. In addition, they enable the heat dissipated by the drive motors to be confined and utilized to eliminate the possibility of frozen ink or sluggish recorder response due to congealing lubricants during low temperature operation.

One of these covers extends over the drive motors and recording pen mechanism. The other cover is hinged to the assembly chassis protecting the expanse of graph paper between the recording pens and paper take-up drum. Approximately a three-inch strip of paper adjacent to the recording pens is left uncovered enabling the operator to make coordinated notations directly on the graph while the recorder is in operation. The cover proper is provided with a transparent plastic window permitting the newly recorded data to be reviewed without rolling back the paper. This cover also serves as a desk for use by the operator.

The recording pens, balance potentiometers, velocity generator drive motors, and velocity generator control "pots." are located at one end of the recorder assembly (Figs. 3 and 4). The recording pens are of a capillary feed type which, when used with the recommended inks, produce unbroken, well-defined, photogenic lines free of blots or smudges at all paper feed speeds. Each recording pen is mounted on a small carriage which rides on cylindrical guide tracks. The tracks are mounted, in two vertical rows containing four each, within the rigid metal framework which extends the width of the recorder chassis. Both the pen carriages and guide tracks are machined to tolerances which reduce the recording error due to mechanical inertia and vibratory effects to a negligible amount. The recording pens are easily and quickly removable from the carriages for purposes of cleaning, adjusting, or replacing.

The eight function-recording pen carriages are combined in pairs and the four combinations mounted on the guide tracks in a staggered arrangement. Fixed stops, which also contribute to the rigidity of the guide tracks, limit the lateral travel of each pair of pens to approximately one-quarter the overall width of the recording paper. An ingenious cam-and-pivot arrangement on each mated pair of pen carriages enables the pens to cross without noticeably distorting their loci. Thus, the locus of each function to be recorded is assured a maximum peak-to-peak amplitude of one-quarter the total width of the recording paper. Careful selection and combination of the functions to be recorded results in a well-balanced graph that is easily read and analyzed.

Two additional recording pens are mounted on separate slides located at the base of the guide track mounting framework near the left end of the assembly (viewed from the front as in Fig. 1). The slides are solenoid actuated and constitute a means of automatically recording, directly on the chart, uniform time intervals and special sequence markers. During normal operation, the solenoid of the time-recording pen is electronically connected to momentarily closed contacts mounted in an accurate clock mechanism. The clock is adjustable to produce closed contacts at any desired frequency from two per second to one per minute. Each time the contacts close, the solenoid is energized, actuating the pen slide and causing a distinctive pip to be inscribed in the normally straight time locus. Operation of the sequence recording pen is similar except that the solenoid is energized by closure of a manually operated pushbutton. This enables any portion of the graph to be clearly marked during the recording run for purposes of subsequent careful study and analysis.

The eight recording pens and the special sequence marker pen contact the recording paper on the same lateral axis. During a normal recording procedure this would be an axis of ordinates parallel to the base time ordinate. Thus the loci of all eight channels and the time and special sequence markers are based on the same time ordinate. This enables the inter-relationship of the recorded functions to be easily determined for any given instant of the recording run without painstakingly computing the time error existing between different loci.

Ink feed mechanism

Figure 9:
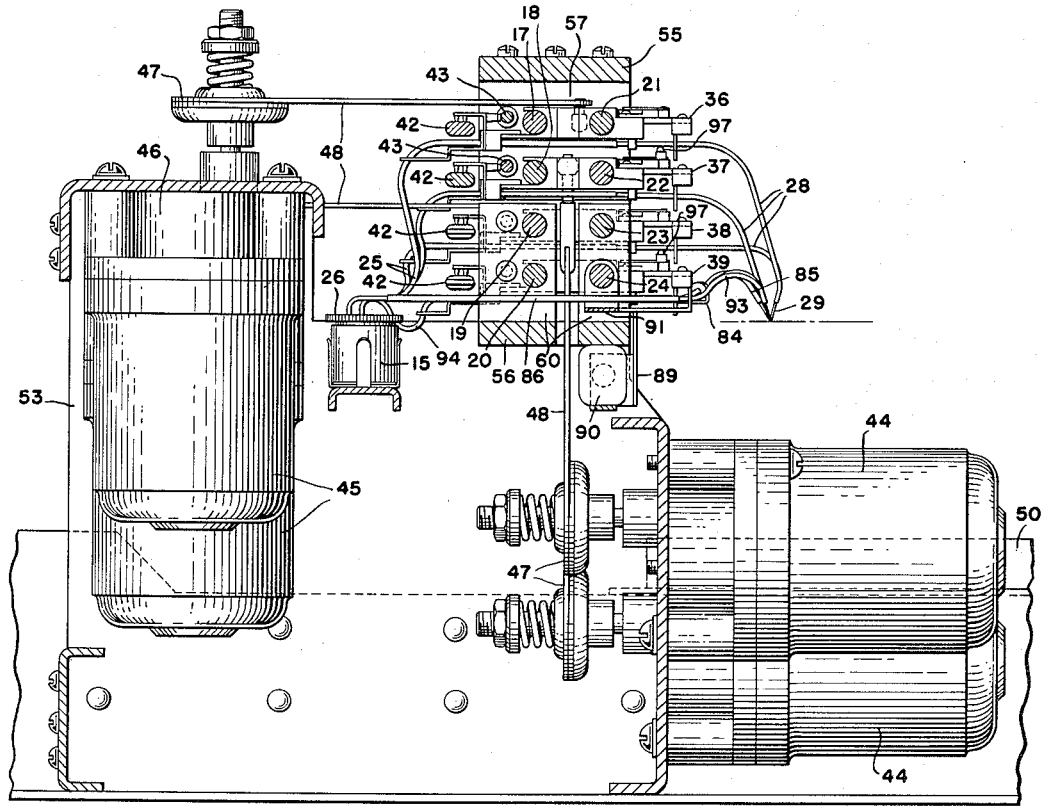
Fig. 9 is a partial, vertical, longitudinal, cross section on line 9—9 of Fig. 3 on an enlarged scale.
Figure 10:
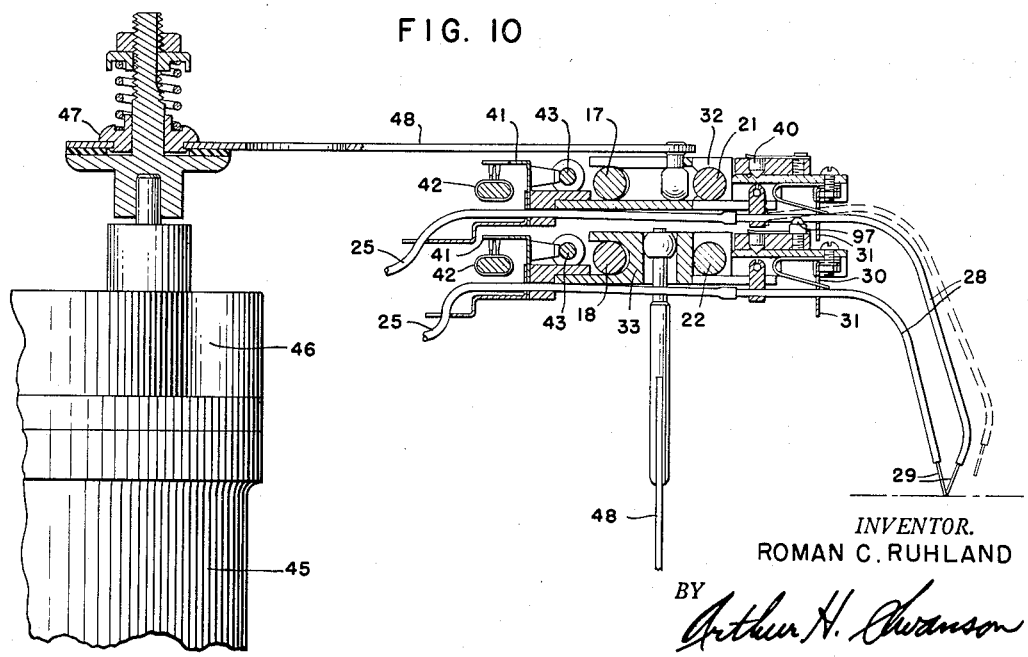
Fig. 10 is a partial, vertical, longitudinal, cross section on line 10—10 of Fig. 3 on a still further enlarged scale.

Fig. 9 shows small, independent, ink wells 15 directly located behind framework on which the guides 17, 18, 19, 20, 21, 22, 23, and 24 are mounted. These guides are horizontal, transversely extending rods along which the pens are slidable. Each of these ink wells is connected to a recording pen, in part, by a short length of flexible tubing 25. Fig. 3 shows that each ink well 15 has a cover plate 26 each having a hole 27 through it. Holes 27 are used for syringe filling and for force priming the pens to induce siphoning of the ink. These cover plates 26 prevent the ink from sloshing and enable the recorder chassis to be tilted ninety degrees from the horizontal without ink spillage. The use of independent ink supply wells for each of the recorder pens enables the use of different colored inks, improving the readability of the finshed graphs. Fig. 10 shows that the flexible tubes 25 communicate, at their ends opposite to the ink wells 15, with relatively rigid pen arms 28 which terminate in pen tips 29 each having a capillary bore passing longitudinally through it. Each pen arm 28 passes through a perforation 30 in a pen guide 31 which is fastened to and forms part of a pen carriage 32, 33, 34, 35, 36, 37, 38, and 39. Each of these pen carriages is slotted so as to receive within it and be slidable along a pair of guides, for example, pen carriage 32 is slid on guides 17 and 21. Pen guides 31 are adjusted longitudinally of the recorder to a limited extent by pulling the pen guide toward the right as seen in Fig. 10 so as to disengage the vertically movable, pointed pin 40 out of one notch in the pen guide 31 and into another notch.

Each of the pen carriages 32—39 carries in its rear face a wiper 41 which bridges between the corresponding potentiometer winding 42 and a collector bar 43. The potentiometer winding and the collector bars are mounted on and insulated from the recorder assembly chassis. Electrical wiring (not shown) to these potentiometer assemblies is protected by extruded tubing and screw clamped to the mounting of the frame-work.

For moving each pen carriage along its guides crosswise of the recorder to a position indicating the instantaneous value of the variable, which the pen is measuring, a motor is connected to each pen. These eight velocity generator drive motors are mounted on the recorder chassis. Motors 44 are horizontally mounted in front of and below the recording pens. The motors 45 are vertically mounted behind the mounting frame. The output shaft of each drive motor is connected by means of a fifty to one reduction gear train 46, an adjustable friction clutch 47, and a crank arm 48 to one of the pen carriages 32–39 and the balance potentiometer wiper 41 carried thereby.

Each of the velocity generator drive motors 44 and 45 consists of a reversible, two phase, induction motor whose rotor and armature of the generator section are mounted on a common shaft. Both the motor and generator are designed for 400 cycles per second alternating current operation. One drive motor stator winding is connected in series with a resonating capacitor and is constantly excited by the applied line voltage. The other stator winding is excited only when an error voltage is applied to the recorder amplifier of that particular channel. The direction of rotation of the motor 44 or 45, and, consequently, the direction of displacement of the recording pen and balance "pot." is dependent on the phase of error voltage.

The field winding of the generator section is constantly excited by 400 cycles per second alternating current. The amplitude of the generated voltage will be proportional to the angular velocity of the armature. Variable potentiometers enable any portion of the generated voltage to be selected for application to the associated amplifier channel as degenerative feedback. These potentiometers (not shown) are mounted on the recorder chassis directly behind the four vertically mounted drive motors 45. The wiper shafts project above the surface of the chassis and are readily accessible for adjustment.

Chassis

Figure 2:
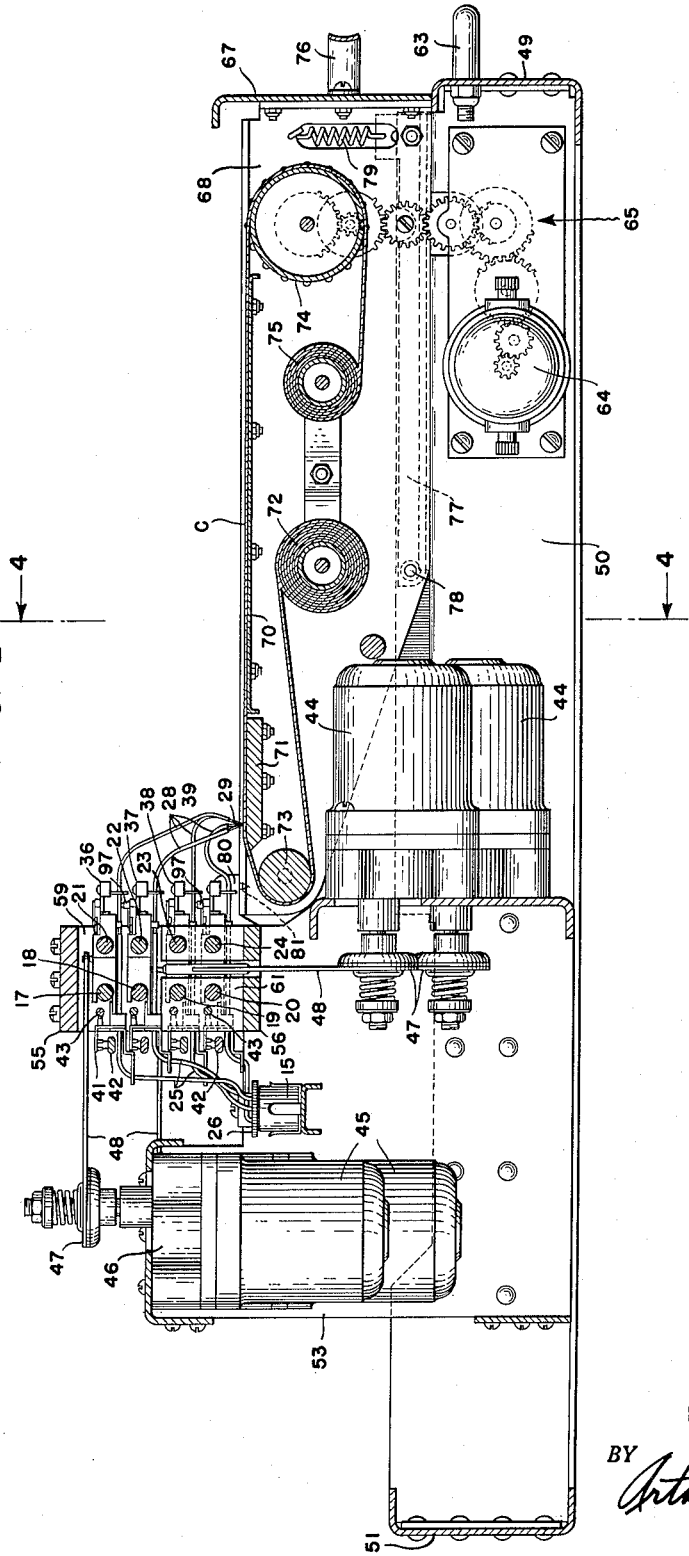
Fig. 2 is a longitudinal, vertical, cross section on line 2—2 of Fig. 1.

Figs. 1, 2, and 3 show that the chassis of the recorder is a generally rectangular frame having a front plate 49, a right side plate 50, a rear plate 51 (Fig. 2), and a left side plate 52 (Fig. 3). The chassis also has a right end stop 53 and a left end stop 54 connected by a top plate 55 and a bottom plate 56. The ends of the guides 17—24 are fixed in the right end stop 53 and in the left end stop 54. Intermediate stops 57, 58, 59, 60, 61, and 62 limit the crosswise travel of each pair of pen carriages 32 and 33, 34 and 35, 36 and 37, 38 and 39, respectively. Handles 63 at the front end of the chassis provide means for manipulating the recorder.

Paper supply drive

Fig. 2 shows a constant speed, 28 volt, direct current motor 64 mounted on right side plate 50 of the chassis and driving a gear train, generally indicated at 65. This gear train incorporates a selector type of transmission which provides a choice of three different paper drive speeds. The desired speed is selected by positioning a small, shift knob 66 located on the right side of the recorder chassis near the front. Paper drive speed can be instantly changed without cessation of recording activities.

Paper supply carriage

Figs. 1 and 2 show that the paper supply carriage consists of a rectangular frame formed of a front plate 67, a right side plate 68, a left side plate 69, a chart backing plate 70, and a writing surface plate 71. Plates 70 and 71 are attached to side plates 68 and 69 near the top thereof so as to underlie the roll of strip chart paper C. This chart roll C is placed in the paper supply carriage on the paper supply drum 72 and is trained over a guide roll 73, writing surface plate 71, chart backing plate 70, and a drive sprocket 74, to take-up drum 75. Sprocket 74 meshes with the final gear of train 65. Motor 64 drives train 65 and sprocket 74 so as to draw the chart C through the recorder at the speed selected by manipulating knob 66. The front plate 67 of the carriage has a handle 76 connected to it for inserting the paper supply carriage into the recorder chassis and for removing it therefrom. Along the bottom edges of side plates 68 and 69 extend a pair of rails 77 of which only the right hand one appears in the drawing. Each of these rails 77 is pivoted at its rear end to a side plate 68 or 69 by a pin 78. At its front end each of the rails 77 is attached to its corresponding side plate by a spring 79. This enables the paper carriage to be lifted by handle 76 about pins 78 as a pivot so that the rear end of the paper supply carriage is lowered sufficiently to break the contact between the recording pens 28 and the chart C above the writing surface plate 71 without completely removing the paper carriage. Bottom plate 56 has a stop 80 projecting forward from it and having a vertical pin 81 depending from it. When the paper carriage is slid into the chassis, the end of said side plate 68 strikes pin 81 and is stopped. This stop can not be cleared until the paper carriage is tilted and shoved completely home so that pin 81 enters a mating hole in side plate 68. Spring 79 then pulls down on the carriage against the rails 77 so that the rear end of the carriage is raised until the chart C contacts the pen tips 29. This protects the pens from damage when inserting the paper chart.

Time pens

Figs. 1, 3, and 4 show that guide 24 has slidably mounted thereon a time pen bracket 82 which consists of a substantially U-shaped body having up-turned, perforated ends 83 through which the guide 24 extends. This bracket carries a pen arm 84 having a pen tip 85. A flexible tubing 86 (Fig. 3) supplies ink to pen arm 84 and tip 85 from an ink well 87. A spring 88 stresses bracket 82 toward the right of Figs. 1, 3 and 4. Bracket 82 has depending from it an armature 89 which cooperates with a solenoid 90. During normal operation, solenoid 90 is connected to contacts which are momentarily closed by an accurate clock (not shown). This clock is adjustable to close contacts at any desired frequency from two per second to one per minute. Each time the contacts close, solenoid 90 is energized and pulls armature 89 and bracket 82 to the left so that pen tip 85 causes a distinctive pip to be inscribed in the time graph, which is normally straight.

Special event or sequence pen

Figs. 1, 3, and 4 show that guide 24 has mounted on it an event pen bracket 91 which has a pair of perforated ears 92 struck up from its ends so as to encircle guide 24. A pen arm 93 has flexible tubing 94 connected to it and communicating with the ink supply in well 87. Spring 88 also stresses bracket 91 to the left. Bracket 91 has an armature 95 depending from it and cooperating with a solenoid 96. Solenoid 96 is energized by closure of a manually operated push-button (not shown). Energization of solenoid 96 attracts armature 95 and pulls pen arm 93 to the right so as to cause a distinctive pip in its graph, which is normally straight.

Pen crossing arrangement

Since all the pens operate on the same time ordinate, it is necessary to provide means whereby one pen may pass another in order that the pens have as large a path of travel as possible. The pens are arranged in pairs each pair having a path of travel of approximately one-fourth of the width of the chart.

Fig. 10 shows a cam-and-pivot arrangement on each mated pair of pen carriages which enables these pens to cross without noticeably distorting their loci. Pen carriage 33 carries at its right a cam 97. When pen carriage 32 lies directly over pen carriage 33, because the variables measured by these pens have the same instantaneous value, the cam 97 engages the pen arm 28 supported on carriage 32. This engagement lifts the pen supported on carriage 32 into the dotted line position in which it is shown in Fig. 10. Since the cam is very small the distance that the pen supported on carriage 32 lifted is not very large so that its graph is not unnecessarily interrupted.

Modification of pens passing cams

Figs. 11, 12, 13 and 14 show means whereby a plurality of pens may be made to record on the same line while, at the same time, each pen can pass the others or all assume the same position. A plurality of guides 100, 101, and 102 are provided. These guides are parallel to each other and may be arranged in horizontal position. On the guides 100, 101, and 102 are mounted pen carriages 110, 111, and 112. Each of these pen carriages is slid along its guide by means of an endless cable 103 which is driven by a potentiometer motor 104 similar to motors 44 and 45. The endless cables 103 are trained over guide rolls 105.

The pen carriages 110, 111, and 112 carry pen arms 120, 121, and 122, respectively. These pen arms terminate in pens which are all adapted to mark the chart along a single line indicated as L—L. The pen carriages carry suitable ink reservoirs for the supply of ink, of different colors if desired, to each of the pens. Each of the pen arms, except the lowermost 122, is adapted to rock in a vertical plane about its guide or the pen arms may be pivoted to the pen carriages. Each of the pen arms carries, adjacent its outer end, a cam 130, 131, and 132, respectively. These cams may be conveniently in the shape of balls and for purposes of illustration their size has been exaggerated. As those skilled in the art will recognize, the balls may be made considerably smaller in size. Moreover, it is contemplated that the ball 132 may be dispensed with, in which case the pen arm 122 will serve as a cam surface in cooperation with each of the balls 130 and 131 for lifting the pen arms 120 and 121 out of engagement with the chart.

The bottommost cam 132 is the smallest and the cams increase in size from the bottom to the top, i. e., cam 131 is larger than 132, and cam 130 is larger than 131. To minimize friction the cams may be pivotally mounted on the pen arms so as to roll around the pen arms as an axis. The cams slide along a cam track 150. When two motors 104 are energized by the different variables to which each is connected, the motors 104 may drive the pen carriages connected thereto to the same position. The pen having the larger cam rides up on the pen having the smaller cam. For example, cam 131 will ride up on or over cam 132. Consider now, the case in which cam 130 is directly resting on top of cam 132. Further suppose that the pen carriage 111 and its associated cam 131 is moved by its motor 104 to the same vertical positions. In such case, cam 131 will enter between cams 132 and 130 and cause cam 130 to ride up on cam 131 while, at the same time, cam 131 rides up on cam 132.

Fig. 13 is a longitudinal cross section showing the cams in different positions from the positions in which they are shown in Figs. 11 and 12. In Fig. 13 the cams and, consequently, the pen arms connected thereto are all in the same vertical plane but the pen arms 120 and 121 have been lifted so as not to interfere with the pen 122.

Fig. 14 is a partial top or plan view of the chart showing the graphs drawn by the pens. Graph 142 is the trace made by pen 122. Since pen 122 is the bottom or lowermost, this graph is continuous and the graphs made by pens 120 and 121 are discontinuous since these pens are lifted over pen 122. Fig. 14 shows an additional advantage of this modification because the discontinuities of the various graphs aid in identifying them. It will be noted that the gap or discontinuity in line 141 where it passes over line 142 is smaller than the gaps or discontinuities in line 140 where it passes over lines 141 and 142. This is due to the fact that the cam 131 is larger than the cam 132 and the cam 130 is still larger than the cam 131.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a recorder for use with a movable chart, a plurality of pen carriages each adapted to be slid along the entire length of a path crosswise of the movement of the chart and separate from and parallel to the paths of the other pen carriages, a plurality of pens each carried by one of said carriages and having limited movement relative thereto, and a plurality of cams one less in number than said pens and each mounted on one of said pen carriages except one and arranged to lift each of the pens on the other pen carriages when the pens and the pen carriages assume the same position.

2. In a recorder for use with a movable chart, a plurality of pen carriages each arranged for travel along the entire length of a path crosswise of the movement of the chart and separate from and parallel to the paths of the other pen carriages, a plurality of flexible tubings each providing an ink feed, a plurality of pens each connected to one of said tubings so as to receive ink therefrom and so as to be carried by one of said carriages, and a plurality of cams one less in number than the number of said pens, said cams each being mounted on each of said pen carriages except one and arranged to lift each of the other pens out of recording position when two pens assume the same recording position.

3. In a recorder, a pair of first means each adapted to make a record at the same time at any point along the entire length of the same line, and second means carried by one of said first means and moving the other of said first means out of recording position when both said first means are at the same point along the line.

4. In a recorder having a chassis, a plurality of pens movably mounted on said chassis for making a record along a single line, a paper supply carriage adapted for insertion into and removal from a position in said chassis in which the paper on said carriage is adapted to receive a record from said pens, means mounting said paper on said carriage and independently of said chassis, a stop interposed between said chassis and said carriage, guides between said chassis and said carriage for holding said carriage for movement along said chassis toward or away from said stop, a pivot between said carriage and said guides whereby said carriage can be moved around said stop and into normal record-receiving position, and springs yieldingly holding said carriage in said normal position against said stop.

5. In a recorder for use with a movable chart, a plurality of pen carriages each movable at an angle to the direction of movement of said chart, a plurality of pens each mounted on one of said carriages so as to be moved thereby crosswise of the chart to record simultaneously along any portion of the same line, a plurality of pen supports each interposed between one of said carriages and one of said pens to provide said pens with limited movement relative to said carriages, and a cam rigidly secured on one of said pen carriages and adapted to engage and lift each of the other pens out of engagement with the chart when the two pens coincide in vertical position.

6. In a recorder for use with a movable chart, a guide structure extending transversely of said chart, a plurality of pen carriages each movable along different portions of said guide structure transversely of the movement of the chart, a plurality of pen supports each secured to one of said pen carriages, a plurality of pens each carried by one of said pen supports so as to be movable across the chart to make at the same time a mark at any position along the same line, and a cam mounted on one of said pen carriages and arranged to contact with and lift out of engagement with the chart any of the other pens with which it comes into vertical alignment.

7. In a recorder for use with a movable chart, a plurality of pen carriages each movable crosswise of the chart, a plurality of pens each carried by one of said pen carriages so as to be moved by said carriage to record at the same time at any point along the same line crosswise of the motion of the chart, a plurality of pivotal connections each between one of said carriages and one of said pens, and a cam mounted on one of said pen carriages and arranged to engage and lift out of contact with the chart each of the other pens when the pen carriages and the pens carried thereby are aligned vertically above the chart.

8. In a recorder for use with a movable chart, a plurality of pens each adapted to record at the same time a corresponding plurality of different variable factors at any point on the same line representing a time ordinate, and cam mechanism interposed between said pens whereby at least one of the pens is moved out of engagement with the chart and thereby out of the position occupied by another of the pens when the variable factors measured by the two pens have the same value, so that said one pen makes a discontinuous record and said other pen makes a continuous record whereby the records made by the two pens are readily distinguishable.

9. In a recorder, a pair of pens each adapted to make a record at the same time at any point along the same single line representing a time ordinate, cam means interposed between said pens so as to lift at least one of said pens out of engagement with the line and thereby out of the position occupied by another of the pens when the variable factors measured by the two pens have the same value, and a pair of electric motors each responsive to a change of electrical condition representing a change in a variable factor being measured and each connected to one of said pens so as to actuate it, said motors each having a shaft at an angle to the shaft of the other motor to economize in space occupied by said motors.

10. In a multiple pen recorder the combination with a chassis having front and back guides and a plurality of pen carriages each mounted on one of said guides, of a plurality of motors each responsive to a variable being measured and arranged in pairs with the pen operating shafts of each pair at an angle to each other to conserve space, and a plurality of pens each mounted on one of said pen carriages and driven by one of said motors, and cam means interposed between the pens so as to actuate at least one of the pens out of engagement with the chart and thereby out of that position occupied by another of the pens when the variables measured by the motors connected to the pens have the same value.

11. In a recorder, a chassis comprising a rectangular frame, a paper supply carriage comprising a rectangular frame adapted to interfit with said chassis, a paper supply drum extending across said carriage frame and adapted to receive the supply roll of a paper strip thereon, a take-up drum extending across said carriage frame and adapted to receive the take-up roll of the strip of paper thereon, rails pivotally mounted on said carriage and having sliding engagement with said chassis, and springs stressing said rails for rotation about their pivots into engagement with the engaged part of said chassis.

12. In a recorder, a chassis comprising a rectangular frame, a plurality of guides extending transversely of said frame, a plurality of pen carriages each slidably mounted on one of said guides, a plurality of pens each mounted on one of said pen carriages, a paper supply carriage comprising a rectangular frame interfitting with said chassis, a paper supply drum extending across said carriage frame and adapted to receive the supply roll of a paper strip thereon, a take-up drum extending across said carriage frame and adapted to receive the take-up roll of the strip of paper thereon, a writing surface extending across said carriage and underlying the pens carried by said pen carriages so as to hold the strip of paper in a position to be engaged by said pens when said chassis and said carriage are in normal operating position, a catch formed of parts secured to said chassis and to said carriage which latch when said carriage is in normal operating position on said chassis to secure said carriage thereto, rails pivotally mounted to said carriage, springs biasing said rails for rotary movement about their pivots into engagement with an adjacent member of said chassis, and a handle on the front of said carriage for use in the attachment and detachment of said carriage to said chassis.

13. In a recorder, a plurality of first means each mounted for movement and actuated to record along the same line representing a time ordinate; and second means, each of said first means but one carrying one of said second means on it, said second means moving those first means, other than the first means on which said second means is carried, out of recording position when more than one of said first means are at the same point along the line.

14. In a recorder, a plurality of pens each mounted for movement and actuated to record along the same line representing a time ordinate, cam means interposed between said pens so as to lift all but one of said pens out of engagement with the line and thereby out of the position occupied by the others of said pens when the variable factors recorded by said pens have the same value, and a plurality of electric motors each responsive to a change of electrical condition representing a change in a variable being measured and each connected to one of said pens so as to actuate it, said motors being located in pairs, each motor of each pair having a shaft at an angle to the shaft of the other motor of the pair to economize in space occupied by said motors.

References Cited in the file of this patent

UNITED STATES PATENTS

| Number | Name | Date |
|---|---|---|
| 919,467 | Robinson | Apr. 27, 1909 |
| 1,316,657 | White et al. | Sept. 23, 1919 |
| 1,762,791 | O'Neill | June 10, 1930 |
| 1,772,605 | Holland | Aug. 12, 1930 |
| 1,847,918 | Blanchard | Mar. 1, 1932 |
| 1,877,467 | Lake | Sept. 13, 1932 |
| 1,878,460 | Borden | Sept. 20, 1932 |
| 1,886,844 | Spitzglass | Nov. 8, 1932 |
| 1,897,850 | La Pierre | Feb. 14, 1933 |
| 2,113,748 | Ross et al. | Apr. 12, 1938 |
| 2,137,592 | Shepard | Nov. 22, 1938 |
| 2,291,475 | Kellogg et al. | July 28, 1942 |
| 2,391,601 | Thomas et al. | Dec. 25, 1945 |
| 2,414,976 | Redhead | Jan. 28, 1947 |
| 2,524,564 | Gorham | Oct. 3, 1950 |
| 2,587,145 | Grib | Feb. 26, 1952 |